(12) United States Patent
Voigt

(10) Patent No.: US 10,735,500 B2
(45) Date of Patent: Aug. 4, 2020

(54) APPLICATION SERVER TO NVRAM PATH

(71) Applicant: HEWLETT PACKARD ENTERPRISE DEVELOPMENT LP, Houston, TX (US)

(72) Inventor: Douglas L Voigt, Boise, ID (US)

(73) Assignee: Hewlett Packard Enterprise Development LP, Houston, TX (US)

(*) Notice: Subject to any disclaimer, the term of this patent is extended or adjusted under 35 U.S.C. 154(b) by 1034 days.

(21) Appl. No.: 14/428,453

(22) PCT Filed: Dec. 11, 2012

(86) PCT No.: PCT/US2012/069011
§ 371 (c)(1),
(2) Date: Mar. 16, 2015

(87) PCT Pub. No.: WO2014/092698
PCT Pub. Date: Jun. 19, 2014

(65) Prior Publication Data
US 2015/0288752 A1    Oct. 8, 2015

(51) Int. Cl.
G06F 15/167    (2006.01)
H04L 29/08    (2006.01)
G06F 3/06    (2006.01)

(52) U.S. Cl.
CPC .......... *H04L 67/1002* (2013.01); *G06F 3/061* (2013.01); *G06F 3/067* (2013.01); *G06F 3/0617* (2013.01); *G06F 3/0658* (2013.01); *G06F 3/0685* (2013.01); *G06F 15/167* (2013.01)

(58) Field of Classification Search
CPC ... H04L 67/1002; G06F 3/061; G06F 3/0617; G06F 3/0658; G06F 3/067; G06F 3/0685; G06F 15/167
USPC .......................................................... 709/212
See application file for complete search history.

(56) References Cited

U.S. PATENT DOCUMENTS

| | | | |
|---|---|---|---|
| 6,594,196 B2 * | 7/2003 | Hsu | G06F 13/18 365/230.03 |
| 6,766,371 B1 * | 7/2004 | Hipp | G06F 9/4843 709/225 |
| 7,437,425 B2 * | 10/2008 | Walton | H04L 49/3009 709/213 |
| 8,020,035 B2 * | 9/2011 | Voigt | G06F 11/201 710/313 |

(Continued)

FOREIGN PATENT DOCUMENTS

| | | |
|---|---|---|
| KR | 100551348 B1 | 2/2006 |
| KR | 100551348 B1 | 2/2006 |

(Continued)

OTHER PUBLICATIONS

Sherlock, D. A. et al., "Memory," PCT Application No. PCT/US2016/023541, filed on Mar. 22, 2016, 35 pages.

(Continued)

*Primary Examiner* — Anthony Mejia
(74) *Attorney, Agent, or Firm* — Trop, Pruner & Hu, P.C.

(57) ABSTRACT

Embodiments herein relate to selecting an application server to nonvolatile random access memory (NVRAM) path. The path provides direct access between an application server and the NVRAM. The path is to transmit data related to at least one of a read and write request to a virtual memory of the application server.

18 Claims, 3 Drawing Sheets

(56) References Cited

U.S. PATENT DOCUMENTS

| | | | |
|---|---|---|---|
| 8,386,838 B1* | 2/2013 | Byan | G06F 11/1484 |
| | | | 714/5.11 |
| 8,627,136 B2* | 1/2014 | Shankar | G06F 11/2028 |
| | | | 709/212 |
| 8,898,417 B1 | 11/2014 | Post et al. | |
| 9,122,588 B1* | 9/2015 | Mondal | G06F 12/0246 |
| 9,250,999 B1* | 2/2016 | Barroso | G06F 12/0246 |
| 10,355,989 B1* | 7/2019 | Panchal | H04L 12/4625 |
| 2003/0233525 A1* | 12/2003 | Reeves | G06F 11/1441 |
| | | | 711/162 |
| 2005/0038958 A1* | 2/2005 | Jadon | G06F 3/061 |
| | | | 711/114 |
| 2005/0102469 A1* | 5/2005 | Zohar | G06F 3/0613 |
| | | | 711/114 |
| 2006/0155875 A1* | 7/2006 | Cheriton | G06F 17/30982 |
| | | | 709/245 |
| 2006/0184760 A1* | 8/2006 | Fujibayashi | G06F 3/0607 |
| | | | 711/170 |
| 2006/0218362 A1* | 9/2006 | McManis | H04L 12/44 |
| | | | 711/162 |
| 2007/0061534 A1* | 3/2007 | Takata | G06F 3/0604 |
| | | | 711/162 |
| 2008/0082741 A1 | 4/2008 | Biessener et al. | |
| 2009/0157984 A1* | 6/2009 | Hara | G06F 3/061 |
| | | | 711/154 |
| 2010/0014525 A1* | 1/2010 | Rehman | G06F 13/387 |
| | | | 370/395.7 |
| 2010/0191903 A1* | 7/2010 | Rao | G11C 7/10 |
| | | | 711/104 |
| 2010/0250700 A1* | 9/2010 | O'Brien | G06F 3/0611 |
| | | | 709/217 |
| 2012/0017037 A1* | 1/2012 | Riddle | G06F 17/30519 |
| | | | 711/103 |
| 2012/0178365 A1* | 7/2012 | Katz | G06K 7/10237 |
| | | | 455/41.1 |
| 2012/0324156 A1* | 12/2012 | Muralimanohar | G06F 11/1044 |
| | | | 711/104 |
| 2013/0054927 A1* | 2/2013 | Raj | G06F 3/0608 |
| | | | 711/170 |
| 2013/0111103 A1 | 5/2013 | Dodson et al. | |
| 2013/0268728 A1* | 10/2013 | Ramanujan | G11C 14/0045 |
| | | | 711/105 |
| 2013/0339572 A1* | 12/2013 | Fanning | G06F 12/1009 |
| | | | 711/102 |
| 2014/0244851 A1* | 8/2014 | Lee | H04L 12/4641 |
| | | | 709/228 |
| 2014/0297938 A1* | 10/2014 | Puthiyedath | G06F 3/0644 |
| | | | 711/105 |
| 2016/0147620 A1 | 5/2016 | Lesartre et al. | |

FOREIGN PATENT DOCUMENTS

| | | |
|---|---|---|
| TW | 326116 | 2/1998 |
| WO | WO-2016018383 A1 | 2/2016 |
| WO | WO-2016023541 | 3/2016 |
| WO | WO-2016036347 A1 | 3/2016 |
| WO | WO-2016122610 A1 | 8/2016 |
| WO | WO-2016122637 A1 | 8/2016 |
| WO | WO-2016122642 A1 | 8/2016 |
| WO | WO-2016159996 A1 | 10/2016 |
| WO | WO-2017019095 A1 | 2/2017 |

OTHER PUBLICATIONS

Condit, J. et al., Better I/O Through Byte-addressable, Persistent Memory, (Research Paper), Proceedings of the ACM SIGPOPS 22nd symposium on Operating systems principles, Oct. 11-14, 2009, 14 pps.

International Search Report and Written Opinion received in related PCT Application No. PCT/US2012/069011, dated Aug. 27, 2013, 12 pgs.

Linux man-pages project, "MMAP(2)," Linux Programmer's Manual, release 3.37, available online at <https://web.archive.org/web/20120315015722/http://man7.org/linux/man-pages/man2/mmap.2.html>, Mar. 15, 2012, 8 pages.

NVMe Work Group, "NVM Express Explained", available online at <https://web.archive.org/web/20121014220207/http://www.nvmexpress.org/index.php/download_file/view/18/1/>,Oct. 14, 2012, 5 pages.

NVMe Work Group, "NVM Express," Revision 1.1, <https://web.archive.org/web/20130130013001/http://www.nvmexpress.org/index.php/download_file/view/102/1/>, Oct. 11, 2012, 163 pages.

Wikipedia, "mmap," available online at <https://en.wikipedia.org/w/index.php?title=Mmap&oldid=517512490>, Oct. 13, 2012, 3 pages.

* cited by examiner

APPLICATION SERVER TO NVRAM PATH

BACKGROUND

Due to recent innovations in solid state storage technology, such technology is being integrated into data systems. Servers of the data systems may seek to write data to or read data from the solid state storage technology. Users, such as administrators and/or vendors, may be challenged to integrate such technology into systems to provide lower latency while still maintaining adequate fault domain isolation and ease of implementation.

BRIEF DESCRIPTION OF THE DRAWINGS

The following detailed description references the drawings, wherein.

DETAILED DESCRIPTION

Figure 1:
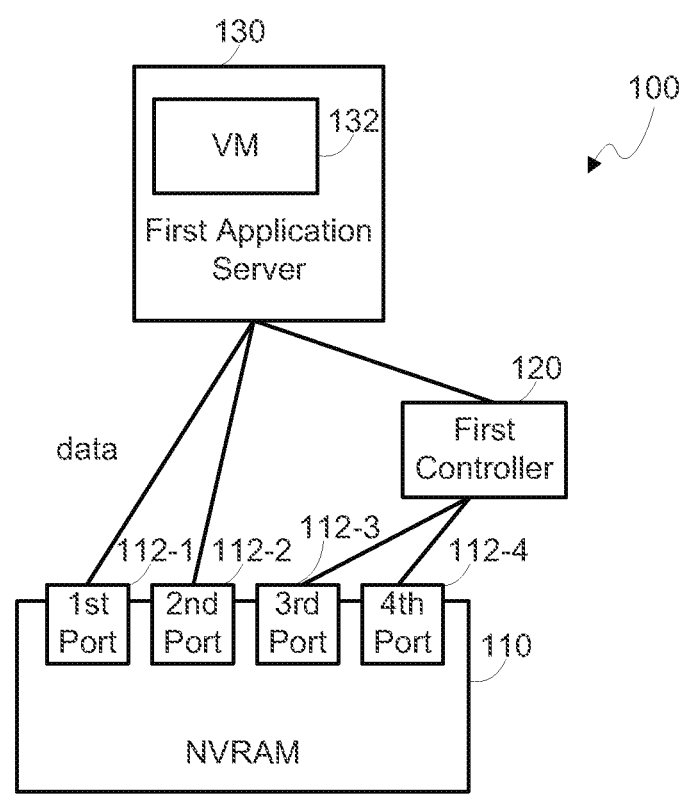
FIG. 1 is an example block diagram of a NVRAM connecting to a path providing direct access to a first application server.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Recent innovation in solid state storage technology such as nonvolatile random access memory (NVRAM) like Memristor, Spin Torque and Phase Change memory, are introducing an ability for a processor to directly access an external storage device for write/store and read/load operations. Adding the solid state storage technology may place a new hierarchy layer above current storage hierarchies. New data flow architectures may be needed to seamlessly integrate this new layer into storage hierarchies while retaining properties such as storage resource sharing, high availability and fully autonomic operation.

Existing solutions include the solid state storage technology being integrated directly into servers as PCI cards or memory. However, such solutions may not exhibit a fault domain isolation necessary to assure levels of high availability associated with today's disk arrays. Still more solutions distribute copies or erasure coded data groupings across server nodes. However, this solution does not support a rapid response time associated with solid state storage technology. Further, large high end memory systems can be extended across servers or server blades, and RAID and other fault tolerance algorithms may be applied within those systems. These systems do not enable the ease of use of a turnkey hierarchical storage appliance.

Embodiments may allow a server to directly access a solid state storage device (such as NVRAM) in response to a read or write request to a virtual memory (VM) of the server, while still isolating server connectivity from storage hierarchy connectivity to assure adequate fault tolerance. For example, a NVRAM may include first, second, third and fourth ports. The first and second ports may connect to a path providing direct access to an application server, with the first and second ports to transmit data related to a read or write access to the virtual memory of the application server. The third and fourth ports may connect to a controller that controls access to data of the NVRAM via at least one of the third and fourth ports.

As the application server and controller are redundantly connected to the NVRAM through separate networks, an adequate level of network fault tolerance may be achieved while still providing direct access from the application server to the NVRAM. By including the controller in the control flow of the NVRAM, such as in map, unmap and sync commands, the controller may provide features like RAID, remote replication, point in time copy, thin provisioning and cache/tier management.

Thus, embodiments may assure low latency communication between the application server and NVRAM while not compromising fault tolerance. Also, the controllers may be enabled to pursue autonomic, fault tolerant storage hierarchy operations and rich data services. Moreover, fault isolation between the application server and controller may be assured and configuration changes may be communicated in such a way that there is no exposure of the NVRAM to data corruption or attack during a change. Fault isolation may refer to having a capability to identify a time, location and/or type of fault that has occurred within the system. Fault tolerance may refer to having a capability to continue operation, possibly at a reduced level, rather than failing completely, when a part of the system fails.

Referring now to the drawings, FIG. 1 is an example block diagram of a NVRAM 110 connecting to a path providing direct access to a first application server 130. In the embodiment of FIG. 1, a system 100 is shown to include the NVRAM 110, a first controller 120 and the first application server 130. The NVRAM 110 may include any type of random-access memory that retains its information when power is turned off, such as Memristor-based, Spin-Torque transfer, and Phase Change memory. The first application server 130 may refer to any type of device that seeks to access the NVRAM 110, such as a main processor of a computer or a computer connected to a computer network. For example, the first application server 130 may host applications and present a memory address table for use by the applications that includes and address space of the NVRAM, such as via implementation of a memory mapped storage system, as explained below.

The first controller 120 may be any type of device involved in controlling access to a memory, such as a memory or disk array controller. The first application server 130 and the first controller 120 may include, for example, a hardware device including electronic circuitry for implementing the functionality described below, such as control logic and/or memory. In addition or as an alternative, the first application server 130 and the first controller 120 may be implemented as a series of instructions encoded on a machine-readable storage medium and executable by a processor.

In FIG. 1, the NVRAM 110 includes first, second, third and fourth ports 112-1 to 112-4. The first and second ports 112-1 and 112-2 connect to a path providing direct access to the first application server 130. The first and second ports 112-1 and 112-2 transmit data related to a read or write access to a virtual memory (VM) 132 of the application server 130. This VM 132 may used by an application of the first application server 130, like directly and contiguous addressable read/write memory. For instance, machine code related to reading or writing may be executed by a central processing unit (CPU) of the first application server 130, which in turn accesses the VM 132 to read or write data for a given address. The VM 132 may virtualize various forms of computer data storage (such as internal memory of the first application server 130 and external memory like the NVRAM 110 and/or disk storage) into a single table. Thus, accessing an address of the VM 132 mapped to the NVRAM 110 may lead to the access being forwarded to the NVRAM 110.

The third and fourth ports 112-3 and 112-4 are to connect to the first controller 120. The first controller 120 is to control access to data of the NVRAM via at least one of the third and fourth ports 112-3 and 112-4. However, the first controller 120 may not directly transfer the data between the NVRAM 110 and the first application server 130. Instead, such data may be transferred directly between the first application server 130 and the NVRAM 110, such as via the first and second ports 112-1 and 112-2.

The first application server 130 may transmit a plurality of commands related to at least one of configuring and maintaining a network, mapping and un-mapping regions of the NVRAM 110 and synchronizing data. At least some of these plurality of commands may be transmitted to the first controller 120, and the first controller 120 may control access to data of the NVRAM 110 based on these commands. For example, the first application server 130 may transmit a map command to the first controller 120, before attempting to directly access the NVRAM 110. The map command may cause to cause at least part of the NVRAM 110 to appear in the first application server's 130 address space even through the NVRAM 110 is part of a separate storage subsystem.

For example, the first controller 120 may at least one of map and pin data of the NVRAM 110 to be directly accessed by the first application server 110, in response to the map command. For instance, the first controller 120 may map and/or pin data of the NVRAM 110 at memory addresses provided by the first application server 130. The term mapping may refer to a technique for incorporating one or more memory addresses of a device, such as the NVRAM 110, into an address table of another device, such as the VM 132 of the first application server 130.

The term pinning may refer to restricting permission to modify data to a specified user, application and/or use. For example, the data pinned in the NVRAM 110 by the first controller 120 may only be modified by the first application server 130, such as via the direct path to the first and second ports 112-1 and 112-2. In this case, even the first controller 120 may not remove and/or modify the pinned data. Thus, embodiments allow the first application server 130 to directly access the NVRAM 110 in response to a read or write request to the VM 132 of the first application server 130, while still isolating server connectivity from storage hierarchy connectivity to assure adequate fault tolerance.

Figure 2:
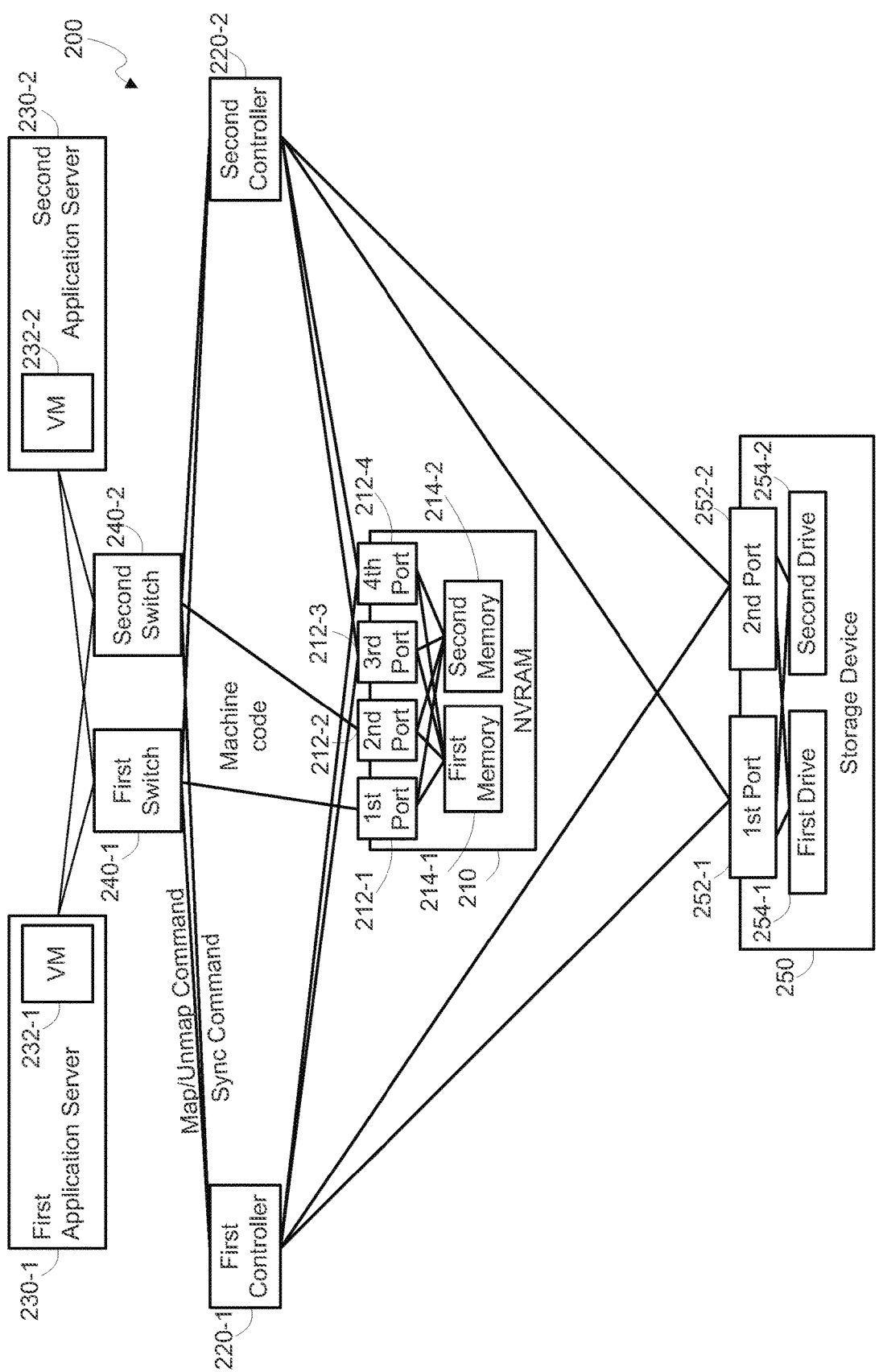
FIG. 2 is another example block diagram of a system including the NVRAM of FIG. 1.

FIG. 2 is another example block diagram of a system 200 including the NVRAM of FIG. 1. In FIG. 2, the system 200 includes a NVRAM 210, a first controller 220-1, a second controller 220-2, a first application server 230-1, a second application server 230-2, a first switch 240-1, a second switch 240-2 and a storage device 250. The NVRAM 210 of FIG. 2 may include similar functionality and/or hardware to the NVRAM 110 of FIG. 1. The first and second application servers 230-1 and 230-2 of FIG. 2 may include similar functionality and/or hardware to the first application server 130 of FIG. 1. Further, the first and second controllers 220-1 and 220-2 of FIG. 2 may include similar functionality and/or hardware to the first controller 120 of FIG. 1. Also, any operations described below for the first application server 230-1 and the first controller 220-1 may respectively be performed by the second application server 230-2 and the second controller 220-2.

In FIG. 2, first and second ports 212-1 and 212-2 of the NVRAM 210 are to connect to paths providing direct access to the first and second application servers 230-1 and 230-2. The first and second ports 212-1 and 212-2 of the NVRAM 210 are to transmit data related to a read or write access to virtual memories (VMs) 232-1 and 232-2 of the first and second application servers 230-1 and 230-2. Third and fourth ports 212-3 and 212-4 of the NVRAM 210 are to connect to the first and second controllers 220-1 and 220-2. The first and second controllers 220-1 and 220-2 are control access to data of the NVRAM 210 via at least one of third and fourth ports 212-3 and 212-4 of the NVRAM 210. The first and second application servers 230-1 and 230-2 are each connected to two redundant networks.

The first switch 240-1 connects to the first application server 230-1, the second application server 230-2, the first controller 220-1, the second controller 220-2 and the first port 212-1 of the NVRAM 210. The second switch 240-2 connects to the first application server 230-1, the second application server 230-2, the first controller 220-1, the second controller 220-2 and the second port 212-2 of the NVRAM 210. The first and second switches 240-1 and 240-2 may be any type of device that links network segments or network devices.

The first and second controllers 220-1 and 220-2 are each connected to the third and fourth ports 212-3 and 212-4 of the NVRAM 210. Further, the first and second controllers 220-1 and 220-2 are each connected to first and second ports 252-1 and 252-2 of the storage device 250. The storage device 250 may be any electronic, magnetic, optical, or other physical storage device, such as a hard disk drive (HDD), solid-state drive (SSD) and the like.

The NVRAM 210 is shown to include a first memory device 214-1 and a second memory device 214-2, where both of the memory devices 214-1 and 214-2 include NVRAM. The first to fourth ports 212-1 and 212-4 are each connected to the two memory devices 214-1 and 214-2 of the NVRAM 210. Similarly, the first and second ports 252-1 and 252-2 of the storage device 250 are each connected to a first drive 254-1 and a second drive 254-2 of the storage device 250. The two memory devices 214-1 and 214-2 may store data redundantly and the two drives 254-1 and 254-2 may also store data redundantly.

For example, the set of memory devices 214-1 and/or 214-2 and the set of drives 254-1 and 254-2 may each define a structure, such as a redundant array of independent disks (RAID), and/or storage mechanisms with fixed or removable media, such as separate HDDs, SSDs and the like. In this case, the first and second controllers 220-1 and 220-2 may include a smart array controller. Embodiments may include more or less than two drives 254 and/or memory devices 214.

As explained above, after the first application server 230-1 transmits a map command to the first controller 220-1, the first controller 220-1 maps and/or pins data and/or addresses of the NVRAM 210 to be used by the first application server 230-1, via the third and/or fourth ports 212-3 and 212-4. In FIG. 2, the first and second application servers 230-1 and 230-2 are shown to include virtual memory (VM) tables 232-1 and 232-2 that include a mapping of the NVRAM 210. After the mapping, the NVRMA 210 and/or first application server 230-1 may transmit data related to the read or write access to the VM 232-1 of the first application server 230-1 via the first and/or second ports 212-1 and 212-2.

At certain times, the first application server 230-1 may carry out a synchronize operation, such as to ensure atomicity. For example, synchronizing the data may enable data or transaction recovery after power loss or insure that modification to related groups of data are visible in their entirety to all subsequent consumers of the data. For certain types of interconnects that support symmetric multiprocessing, part of the synchronize operation may include cache coherency protocols that involve application server processors. For instance, during the synchronize operation, instructions may be executed by a processor of the first application server 230-1 to insure that all of the data indicated by the synchronize operation are flushed from the processor's volatile caches. Further, the first application server 230-1 may issue a sync command to the NVRAM 210 during the synchronize operation via the direct path using the first port 212-1 to insure that any buffers along that path are flushed.

Moreover, the first application server 230-1 may transmit the sync command to the first controller 220-1. The first controller 220-1 may only capture the mapped data indicated as recently synchronized in response to the sync command. Thus, the first application server 230-1 may ensure through the sync command that the first controller 220-1 does not access, remove and/or modify data that is being or will be updated. In one embodiment, the first controller 220-1 may use the sync command as a trigger to capture recently synchronized data as a point of consistency for staging to lower levels of the storage hierarchy or as part of replication, deduplication and/or snapshot processing.

The first controller 220-1 is to determine the recently synchronized data based on state information of the first application server 230-1 that records the paths used to access the NVRAM 210. For example, the first application server 230-1 may record and/or constrains the path(s) used to flush the processor's caches prior to the synchronize command so that all buffers along those paths can be further flushed during the sync command.

When the first application server 230-1 no longer requires direct access to a mapped region of the NVRAM 210, the first application server 230-1 may issue an unmap command to the first controller 220-1. The first controller 220-1 is to unmap and/or unpin the data of the NVRAM 210 in response to the unmap command. Further, the first controller 220-1 may ban the first application server 230-1 from direct access to the unmapped data of the NVRAM 210. For example, the first application server 230-1 may not access the NVRAM 210 via the first port 212-1, after the unmap command. Also, once the first controller 220-1 recognizes that the first application server 230-1 will no longer be directly accessing those regions of the NVRAM 210, the first controller 220-1 may participate in storage hierarchy management more broadly than if those regions were still being accessed.

If the first application server 230-1 fails to transmit the unmap command, such as because of a failure of the first application server 230-1 or communication link thereof, other mechanisms may still determine that the data of the NVRAM 210 is to be unmapped. In one embodiment, the NVRAM 210 may automatically unmap the data in response to at least one of detecting a change in a configuration of a network including the first application server 230-1 and noticing an absence of a presence of the first application server 230-1. For example, the NVRAM 210 may detect that the first application server 230-1 is no longer included in the network and/or that its "heartbeat" (e.g. a packet sent at intervals to affirm an identity of device) has vanished.

In another embodiment, the first controller 220-1 may indicate that the first application server 230-1 is to be unmapped in response to at least one of detecting a change in the configuration of the network, noticing the absence of the presence of the first application server 230-1 and a notification from at least one of the NVRAM 210 and the second application server 230-2. In yet another embodiment, the second application server 230-2 may execute an unmap command on behalf of the first application server 230-1.

At least two (or even each) of the ports 212-1 to 212-4 of the NVRAM 210 may be connected to different networks. The NVRAM 210 may detect the configuration change of a network that is visible through one of the ports 212-1 to 212-4 and notify an other of the ports 212-1 to 212-4 of the configuration change. Thus, other components connected to different ports 212 of the NVRAM 210, such as the first controller 220-1, the second application server 230-2 and the second controller 220-2 may be notified if the first application server 210-1 fails.

The first application server 230-1 may fail over to the second application server 230-2 if at least one of a link and domain of the first application server 230-1 fails. The first application server 230-1 may notify the first controller 220-1 of the fail over, if the first controller 220-1 can not detect the fail over. The first controller 220-1 may fail over to the second controller 220-2, if the first controller 220-1 fails. The first controller 220-1 may fail over to a non-failing domain, if at least one of a link and domain of the first controller 220-1 fails. The term fail over may refer to an automatic switching to a redundant or standby computer server, system, hardware component or network upon the failure or abnormal termination of the previously active application, server, system, hardware component or network.

While FIG. 2 shows two switches 240-1 and 240-2 for forwarding data, embodiments may include any type and/or number of network devices capable of processing, routing and/or forwarding data, such as a router, gateway, hub and the like. Furthermore, embodiments may include more or less application servers 230, controllers 220, switches 240, storage devices 250, and the like than that shown in FIG. 2.

Figure 3:
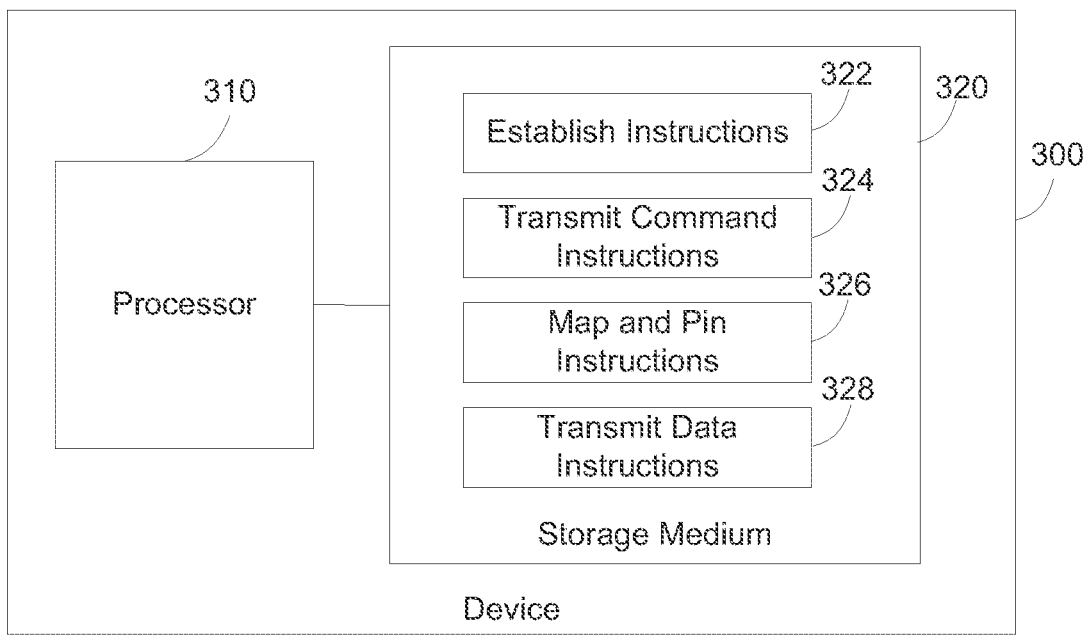
FIG. 3 is an example block diagram of a computing device including instructions for transmitting using a path between an application server and a NVRAM.

FIG. 3 is an example block diagram of a computing device 300 including instructions for transmitting using a path between an application server and a NVRAM. In the embodiment of FIG. 3, the computing device 300 includes a processor 310 and a machine-readable storage medium 320. The machine-readable storage medium 320 further includes instructions 322, 324, 326 and 328 for transmitting using a path between an application server (not shown) and a NVRAM (not shown).

The computing device 300 may be, for example, a secure microprocessor, a notebook computer, a desktop computer, an all-in-one system, a server, a network device, a controller, a wireless device, or any other type of device capable of executing the instructions 322, 324, 326 and 328. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), other hardware devices suitable for retrieval and execution of instructions stored in the machine-readable storage medium 320, or combinations thereof. The processor 310 may fetch, decode, and execute instructions 322, 324, 326 and 328 to implement transmitting using the path between the application server and the NVRAM. As an alternative or in addition to retrieving and executing instructions, the processor 310 may include at least one integrated circuit (IC), other control logic, other electronic circuits, or combinations thereof that include a number of electronic components for performing the functionality of instructions 322, 324, 326 and 328.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for transmitting using the path between the application server and the NVRAM.

Figure 4:
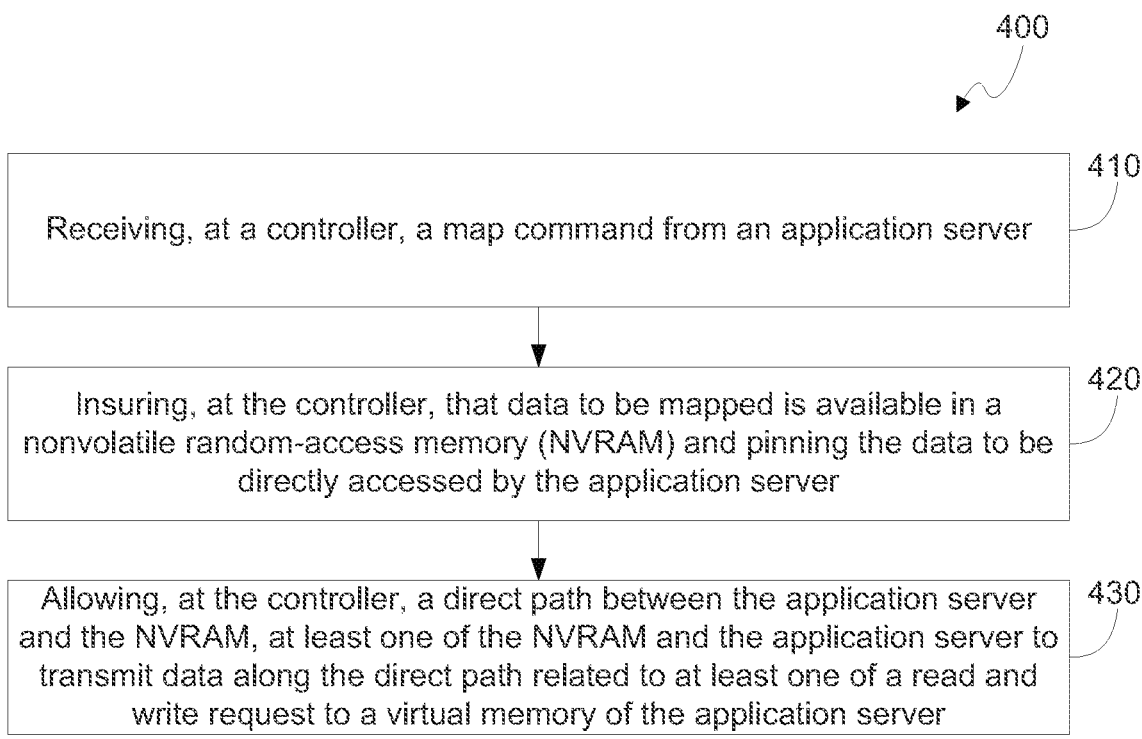
FIG. 4 is an example flowchart of a method for allowing a direct path between an application server and a NVRAM.

Moreover, the instructions 322, 324, 326 and 328 when executed by a processor (e.g., via one processing element or multiple processing elements of the processor) can cause the processor to perform processes, such as, the process of FIG. 4. For example, the establish instructions 322 may be executed by the processor 310 to establish a first path between the application server and the NVRAM, a second path between a controller (not shown) and the application server, and a third path between the controller and the NVRAM.

The transmit command instructions 324 may be executed by the processor 310 to transmit a command between the application server and the controller using the second path. The map and pin instructions 326 may be executed by the processor 310 to map and pin data of the NVRAM to be directly accessed by the application server using the third path, in response to the command. The transmit data instructions 328 may be executed by the processor 310 to transmit data directly between the application server and NVRAM using the first path. The data along the first path is related to at least one of a read and write request to a virtual memory of the application server.

FIG. 4 is an example flowchart of a method 400 for allowing a direct path between an application server and a NVRAM. Although execution of the method 400 is described below with reference to the first controller 120, other suitable components for execution of the method 400 can be utilized, such as the first controller 220-1 or the second controller 220-2. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the first controller 120 receives a map command from the first application server 130. Next, at block 420, the first controller 120 insures that data to be mapped is available in the NVRAM 110 and pins the data to be directly accessed by the first application server 130. Then, at block 430, the first controller 120, allows a direct path between the first application 130 server and the NVRAM 110.

At least one of the NVRAM 110 and the first application 130 server is to transmit data along the direct path related to at least one of a read and write request to a virtual memory (VM) 132 of the first application server 130. The first controller 120 is to not receive the data to be transmitted between the NVRAM 110 and the first application server 130. The first application server 130 is not allowed the direct path to the NVRAM 110 before the data is insured at block 420.

According to the foregoing, embodiments provide a method and/or device for a server and NVRAM to directly transmit data related to a read or write access to a virtual memory of the server, while still isolating server connectivity from storage hierarchy connectivity to assure adequate fault tolerance. By including the controller in the control flow of the NVRAM, such as in map, unmap and sync commands, the controller may provide features like RAID, remote replication, point in time copy, thin provisioning and cache/tier management. Thus, embodiments may assure low latency communication between application servers and NVRAM while not compromising fault tolerance.

I claim:

1. A system comprising:
   a nonvolatile random-access memory (NVRAM) including a first port and a second port;
   a first controller connected to the first port of the NVRAM and to control access of the NVRAM using the first port, wherein the first controller is to:
      receive a map command from the first application server, the map command to cause memory addresses of the NVRAM to appear in a virtual memory address space of a first application server connected to the second port of the NVRAM, and
      in response to the map command, and using the first port of the NVRAM, map the memory addresses of the NVRAM to appear in the virtual memory address space of the first application server, enabling transfer of data related to at least one of a read and write request between the NVRAM and the virtual memory of the first application server via the second port, and pin data of the NVRAM to be directly accessed by the first application server, wherein the pinning of the data of the NVRAM to be directly accessed is to restrict permission to modify the pinned data to the first application server, such that the first controller is unable to modify the pinned data.

2. The system of claim 1, wherein:
   the NVRAM comprises a third port and a fourth port;
   the first and the third ports of the NVRAM are redundantly connected to the first controller; and
   the second and fourth ports of the NVRAM are redundantly connected to the first application server.

3. The system of claim 1, wherein,
   the first controller is to unmap the memory addresses of the NVRAM in response to an unmap command received from the first application server, the unmapping preventing the first application server from directly accessing the memory addresses of the NVRAM that have been unmapped.

4. The system of claim 1, wherein the first controller is to indicate that the first application server is to be unmapped in response to at least one of detecting a change in a configuration of a network including the first application server, noticing an absence of the first application server, or receiving a notification from a second application server.

5. The system of claim 1, wherein,
the first controller is not to directly transfer data between thy: NNTRAM and the first application server, and
the NVRAM includes at least one of a Memristor-based, Spin-Torque transfer, and Phase Change memory.

6. The system of claim 1, wherein the mapping of the memory addresses of the NVRAM incorporates the memory addresses of the NVRAM into an address table of the first application server used by the first application server to directly access data at the memory addresses of the NVRAM.

7. The system of claim 2, further comprising:
a second controller redundantly connected to the first and third ports of the NVRAM; and
wherein the second and fourth ports of the NVRAM are redundantly connected to a second application server.

8. The system of claim 7, wherein the second controller is to:
using the first or third port of the NVRAM, map other memory addresses of the INNTRAM to appear in virtual memory address space of the second application server, enabling transfer of data related to at least one of a read and write request between the NNTRAM and the virtual memory of the second application server via the second or the forth port.

9. The system of claim 7, wherein:
the second and fourth ports of the NVRAM are redundantly connected to the first application server via first and second switches; and
the second and fourth ports of the NVRAM are redundantly connected to the second application server via the first and second switches.

10. The system of claim 9, wherein:
the first controller is redundantly connected to each of the first and second application servers; and
the second controller is redundantly connected to each of the first and second application servers.

11. A method, comprising:
receiving, at a controller that is connected to a first port of a nonvolatile random-access memory (NVRAM) and that controls access of the NVRAM using the first port, a map command from an application server connected to a second port of the NVRAM, the map command to cause memory addresses of the NVRAM to appear in a virtual memory address space of the application server;
in response to the map command:
with the controller and using the first port of the NVRAM, performing mapping of the memory addresses of the NVRAM to appear in the virtual memory address space of the application server to enable transfer of data related to at least one of a read and write request between the NVRAM and the virtual memory of the application server via the second port; and
pinning data of the NVRAM to be directly accessed by the application server, the pinning of the data of the NVRAM to be directly accessed restricting permission to modify the pinned data to the application server, such that the controller is unable to modify the pinned data.

12. The method of claim 11, wherein
the controller does not receive data transferred between the NVRAM and the application server as part of the transfer of data.

13. The method of claim 11, wherein the mapping of the memory addresses of the NVRAM incorporates the memory addresses of the NVRAM into an address table of the application server, the method further comprising:
using, by the application server, the address table to directly access data at the memory addresses of the NVRAM.

14. The method of claim 11, wherein:
the NVRAM comprises a third port and a fourth port;
the first and the third ports of the NVRAM are redundantly connected to the controller; and
the second and fourth ports of the NVRAM are redundantly connected to the application server.

15. The method of claim 14, wherein:
the first and third ports of the NVRAM are redundantly connected to another controller; and
the second and fourth ports of the NVRAM are redundantly connected to another application server;
the method further comprising:
using the first or third port of the NVRAM, mapping other memory addresses of the NVRAM to appear in virtual memory address space of the another application server, enabling transfer of data related to at least one of a read and write request between the NVRAM and the virtual memory of the another application server via the second or the forth port.

16. A non-transitory computer-readably storage medium storing instructions that upon execution cause a system to:
with a first controller connected to a first port of a nonvolatile random-access memory (NVRAM), receive a map command from a first application server connected to a second port of the NVRAM, the map command to cause memory addresses of the NVRAM to appear in a virtual memory address space of the first application server connected to the second port of the NVRAM; and
in response to the map command, and using the first port of the NVRAM, map the memory addresses of the NVRAM to appear in the virtual memory address space of the first application server, enabling transfer of data related to at least one of a read and write request between the NVRAM and the virtual memory of the first application server via the second port, and pin data of the NVRAM to be directly accessed by the first application server, the pinning of the data of the NVRAM to be directly accessed restricting permission to modify the pinned data to the first application server, such that the first controller is unable to modify the pinned data.

17. The non-transitory computer-readable storage medium of claim 16, wherein:
the NVRAM comprises a third port and a fourth port;
the first and the third ports of the NVRAM are redundantly connected to the first controller;
the first and the third ports of the NVRAM are redundantly connected to a second controller;
the second and fourth ports of the NVRAM are redundantly connected to the first application server; and
the second and fourth ports of the NVRAM are redundantly connected to a second application server.

18. The non-transitory computer-readable storage medium of claim 16, wherein the mapping of the addresses of the NVRAM incorporates the addresses of the NVRAM into an address table of the application server, the instructions upon execution causing the system to further:
use, by the application server, the address table to directly access data at the addresses of the NVRAM.

* * * * *